(12) United States Patent
Huang et al.

(10) Patent No.: US 8,767,899 B2
(45) Date of Patent: Jul. 1, 2014

(54) SAMPLING PHASE SELECTION METHOD FOR A STREAM OF DATA BITS

(75) Inventors: Ren-Feng Huang, Kaohsiung (TW); Hui Wen Miao, Hsinchu (TW); Ko-Yang Tso, Taipei County (TW); Chin-Chieh Chao, Hsinchu (TW)

(73) Assignee: Raydium Semiconductor Corporation, Hsinchu County (TW)

( * ) Notice: Subject to any disclaimer, the term of this patent is extended or adjusted under 35 U.S.C. 154(b) by 46 days.

(21) Appl. No.: 13/603,097

(22) Filed: Sep. 4, 2012

(65) Prior Publication Data

US 2013/0058445 A1 Mar. 7, 2013

(30) Foreign Application Priority Data

Sep. 6, 2011 (TW) .............................. 100132014 A (51) Int. Cl.
*H04L 7/00* (2006.01)
(52) U.S. Cl.
USPC .......................................................... 375/355
(58) Field of Classification Search
USPC .......................................................... 375/355
See application file for complete search history.

(56) References Cited

U.S. PATENT DOCUMENTS

| | | | | |
|---|---|---|---|---|
| 5,168,493 A * | 12/1992 | Nelson et al. | ................. | 370/314 |
| 7,236,553 B1 * | 6/2007 | Choi et al. | ..................... | 375/355 |
| 2002/0089359 A1 * | 7/2002 | Friedman et al. | ............. | 327/144 |
| 2003/0023891 A1 * | 1/2003 | Hoke et al. | .................... | 713/401 |
| 2005/0058184 A1 * | 3/2005 | Paul et al. | ..................... | 375/148 |

* cited by examiner

*Primary Examiner* — Shuwang Liu
*Assistant Examiner* — Nader Bolourchi (57) ABSTRACT

The current disclosure discloses a sampling phase selection method for a data stream, wherein the data stream has a variable data rate in a fixed time period. The method comprises the following steps: generating M section signals with the same time interval during the fixed time period of the data stream, generating N continuous clock phases according to a rising edge of each of the section signals, selecting one of the continuous clock phases corresponding to the different section signals in turn to provide a sampling phase, performing a plurality of samplings on the data stream to generate a flag signal, repeating the selecting and the sampling steps to generate N flag signals corresponding to the different section signals, and selecting a final sampling phase according to the N flag signals corresponding to the different section signals.

9 Claims, 8 Drawing Sheets

|  | PH [0] | PH [1] | PH [2] | PH [3] |
|---|---|---|---|---|
| seq 1 | 0 | 1 | 1 | 1 |
| seq 2 | 1 | 0 | 1 | 1 |
| seq 3 | 1 | 1 | 1 | 1 |
| seq 4 | 1 | 1 | 1 | 1 |
| Final Flag Signal | 0 | 0 | 1 | 1 |

FIG. 9

SAMPLING PHASE SELECTION METHOD FOR A STREAM OF DATA BITS

BACKGROUND

1. Technical Field

The current disclosure relates to a method for selecting a sampling phase of a data stream and, in particular, to a method for selecting a sampling phase of a data stream having a variable data rate during a fixed time period.

2. Description of Related Arts

Operations of most electronic devices are driven by a clock signal. Due to rapid developments in technology, the working frequency of the clock signal may be above GHz and the clock signal may have a stable oscillating frequency which is generated by an oscillator.

However, the oscillator has a high Q value which is the allowed energy of the clock signal concentrated on a narrow baseband and the harmonic wave of the baseband. When the energy is concentrated on a high frequency harmonic wave, the radiation produced by Electro-Magnetic Interference (EMI) may be greater than regulation standards made by FCC, JEITA and IEC.

For reducing EMI, a Spread Spectrum (SS) is utilized to modulate the clock signal. The frequency of the SS modulated clock signal may not be fixed at a certain frequency but may be varied within a given frequency range. Therefore, the clock signal may have a lower energy distribution or lower frequency range to reduce the effect of EMI.

Figure 1A:
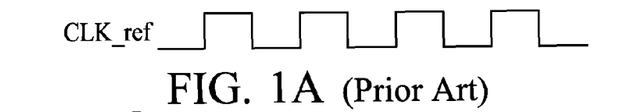
FIG. 1A shows a clock signal CLK_ref which is not modulated by SS.
Figure 1B:
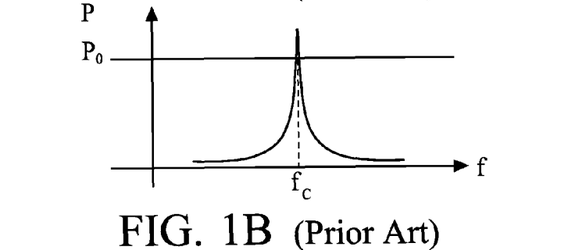
FIG. 1B shows a frequency spectrum of the clock signal CLK_ref.
Figure 1C:
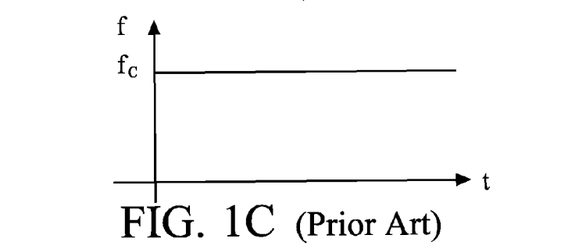
FIG. 1C shows a diagram of the clock signal CLK_ref and time.

FIG. 1A shows a clock signal CLK_ref which is not modulated by SS. As shown in FIG. 1A, the clock signal CLK_ref includes a fixed frequency $f_c$. FIG. 1B shows a frequency spectrum of the clock signal CLK_ref. As shown in FIG. 1B, the energy at frequency $f_c$ is above a given threshold energy $P_0$. The given threshold energy $P_0$ is the energy for causing EMI. FIG. 1C shows a diagram of the clock signal CLK_ref and time.

Figure 2A:
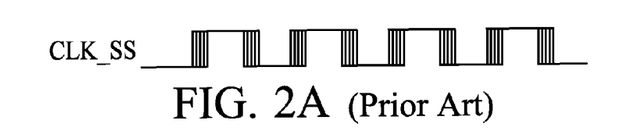
FIG. 2A shows a clock signal CLK_SS which is modulated by SS.
Figure 2B:
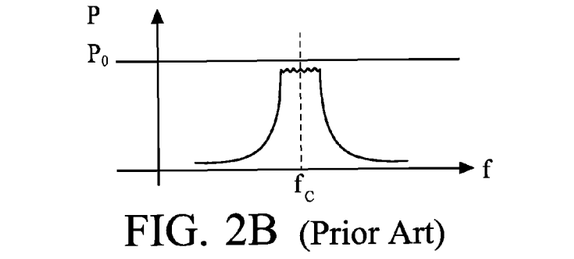
FIG. 2B shows a frequency spectrum of the clock signal is CLK_SS.
Figure 2C:
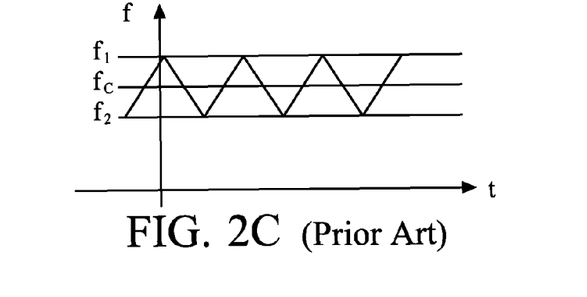
FIG. 2C shows a diagram of the clock signal CLK_SS and time.

FIG. 2A shows a clock signal CLK_SS which is modulated by SS. FIG. 2B shows a frequency spectrum of the clock signal CLK_SS. As shown in FIG. 2B, the energy of the clock signal CLK_SS has been spread to frequency ranges $f_1$ and $f_2$. Therefore, is energy at frequency $f_c$ is under a given threshold energy $P_0$. FIG. 2C shows a diagram of the clock signal CLK_SS and time. Referring to FIG. 2C, the output frequency of the clock signal CLK_SS may periodically work between a range of frequency f1 and f2.

Moreover, a high speed data stream may be modulated by SS and transmitted in order to reduce EMI. When the modulated data stream is transmitted, data jitter and phase skew between the modulated clock signal and the data stream may affect the sampling section of significant bits.

If a conventional oversampling is performed to sample bits of data of the modulated data stream, a certain sampling clock phase may only sample bits of data of a certain frequency band. Moreover, when a high-speed data stream is transmitted via a noise channel, the high-speed data stream may be interfered by a noise signal having a fixed time section.

If a conventional oversampling is performed on the high-speed data stream, the noise signal may be continuously sampled by a certain sample phase. Therefore, the current disclosure provides a method for selecting a sampling phase of a data stream.

SUMMARY

In accordance with one embodiment of the current disclosure, a method for selecting a sampling phase of a data stream, wherein the data stream has a variable data rate during a fixed time period, comprising the following steps: generating M section signals, having a same time interval, during the fixed time period of the data stream; is generating N continuous clock phases, according to a rising edge of each section signal; selecting one of the N continuous clock phases in turn to provide a sample phase, wherein the continuous clock phases are corresponding to different section signals; performing a plurality of samplings on the data stream to generate a flag signal; repeating steps of the selecting and the sampling to generate N flag signals which are corresponding to different section signals; and selecting a final sampling phase according to the N flag signals which are corresponding to the different section signals.

In accordance with one embodiment of the current disclosure, a method for selecting a sampling phase of a data stream, wherein the data stream has a variable data rate during a fixed time period, comprising the following steps: generating a plurality of calibration signals, wherein the calibration signals are synchronized with the data stream; generating a plurality of counting values of a rising edge by calculating the quantity of rising edges of the calibration signals; generating a plurality of clock sequences, having different delay times, wherein each of the clock sequences includes a plurality of serial clock phases; selecting one of N serial phases as a sampling clock phase in turn, wherein the N serial phases are selected in turn from the serial clock phases of the clock sequences, having different delay times; performing a plurality of samplings on the data stream by the sampling clock phase to generate a flag signal; repeating the steps of selecting and performing to generate a plurality of flag signals corresponding to different clock sequences; and selecting a final sampling clock phase according to the flag signals corresponding to different clock sequences.

In order to provide further understanding of the techniques, means, and effects of the current disclosure, the following detailed description and drawings are hereby presented, such that the purposes, features and aspects of the current disclosure may be thoroughly and concretely appreciated; however, the drawings are provided solely for reference and illustration, without any intention to be used for limiting the current disclosure.

BRIEF DESCRIPTION OF THE DRAWINGS

A more complete understanding of the present disclosure may be derived by referring to the detailed description and claims when considered in connection with the Figures, where like reference numbers refer to similar elements throughout the Figures, and:

DETAILED DESCRIPTION

The current disclosure discloses a method for selecting a sampling phase of a data stream, which may be applied on any kind of data transmitting interface, such as that of a driving system of a flat screen display.

Figure 3:
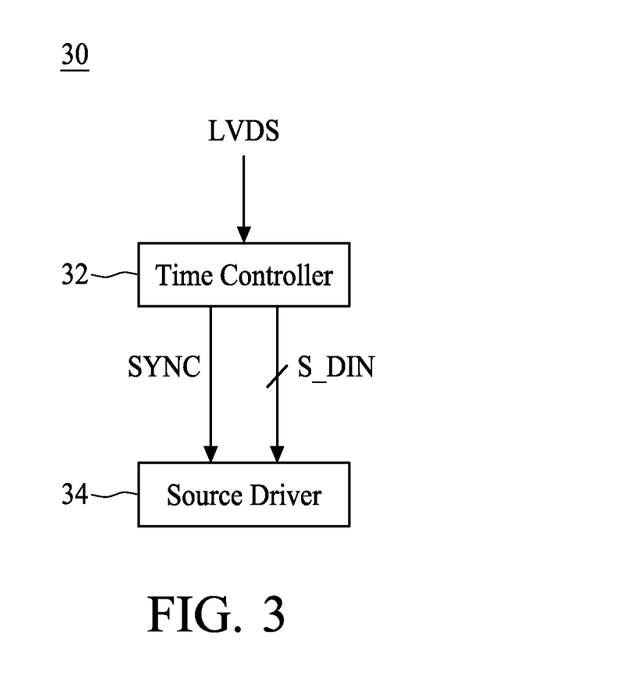
FIG. 3 shows a driving system 30 of a flat-screen display utilizing a method for selecting a sampling phase of a data stream of one embodiment of the current disclosure

FIG. 3 shows a driving system 30 of a flat screen display is utilizing a method for selecting a sampling phase of a data stream of one embodiment of the current disclosure. The driving system 30 comprises a time controller 32 and a source driver 34. The time controller 32 may generate a data stream S_DIN, including frame data needed by the display panel, after receiving a Low-Voltage Differential Signaling (LVDS).

The data stream S_DIN may be transmitted to the source driver 34 via a data transmitting interface. In one embodiment of the current disclosure, the transmission of the data stream S_DIN may meet requirements of a point to point mini-LVDS protocol. Moreover, in order to meet regulations of electronic magnetic interface (EMI), the data stream may be designed as a data stream with a periodic spread spectrum.

Moreover, the time controller 32 may transmit a calibration signal SYNC to the source driver 34. During the calibration, the source driver 34 may select a sampling clock phase, which would be the best sampling clock phase to the data stream S_DIN, from a plurality of clock phases.

Figure 4:
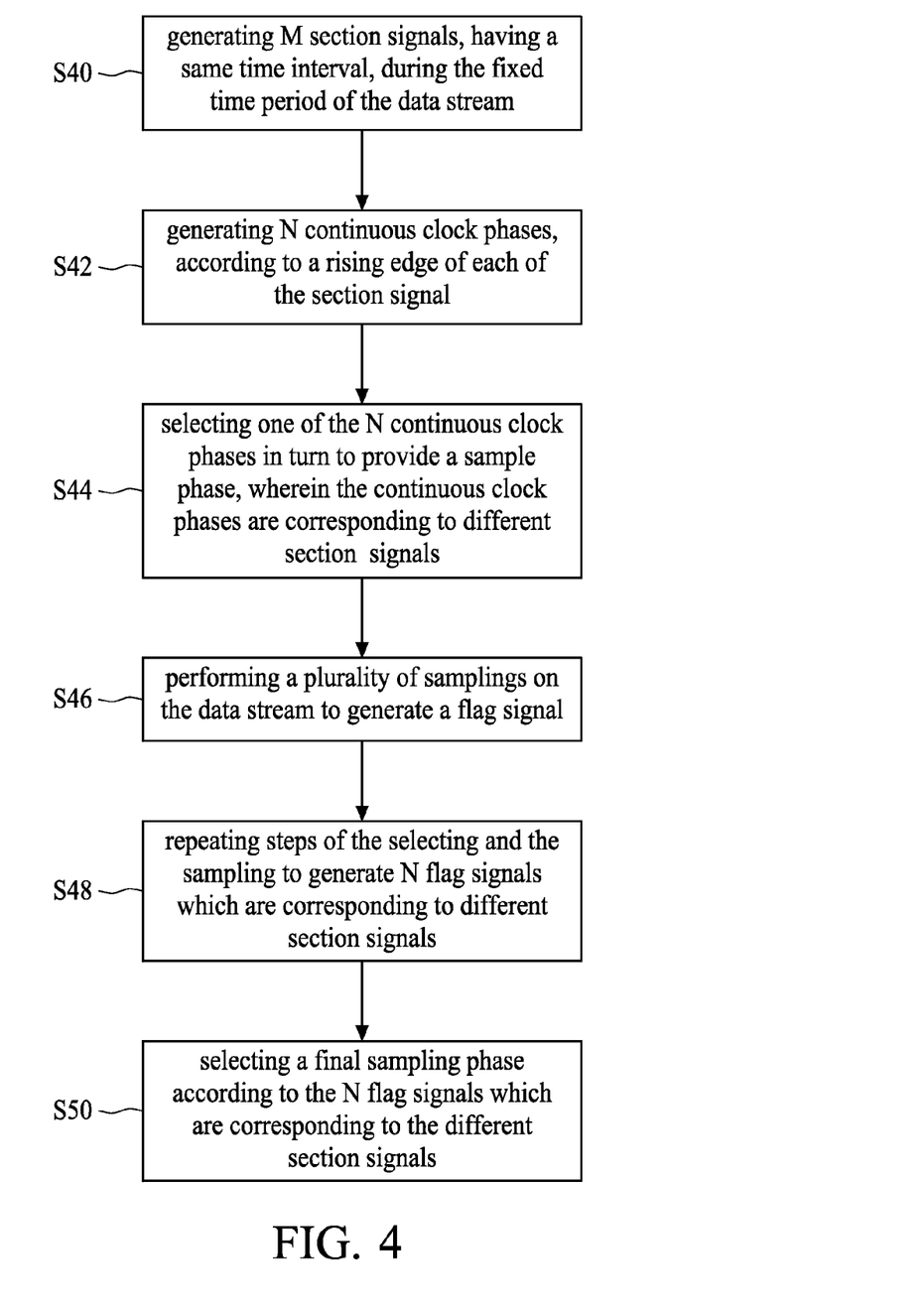
FIG. 4 shows a flow chart of a method for selecting a sampling phase of a data stream of one embodiment of the current disclosure.

FIG. 4 shows a flow chart of a method for selecting a sampling phase of a data stream of one embodiment of the current disclosure. The data stream S_DIN has a variable data rate during a fixed time period. The method for selecting a sampling phase of a data stream comprises the following steps: step S40, M section signals, having a same time interval, may be generated during the fixed time period of the data stream. Step S42, N continuous clock phases may be generated according to a rising edge of each section signal.

Step S44, one of the N continuous clock phases may be selected in turn to provide a sample phase, wherein the continuous clock phases are corresponding to different section signals. Step S46, a plurality of samplings may be performed on the data stream to generate a flag signal. Step S48, steps of the selecting and the sampling may be repeated to generate N flag signals which are corresponding to different section signals. Step S50, a final sampling phase may be selected according to the N flag signals which are corresponding to the different section signals.

Figure 5:
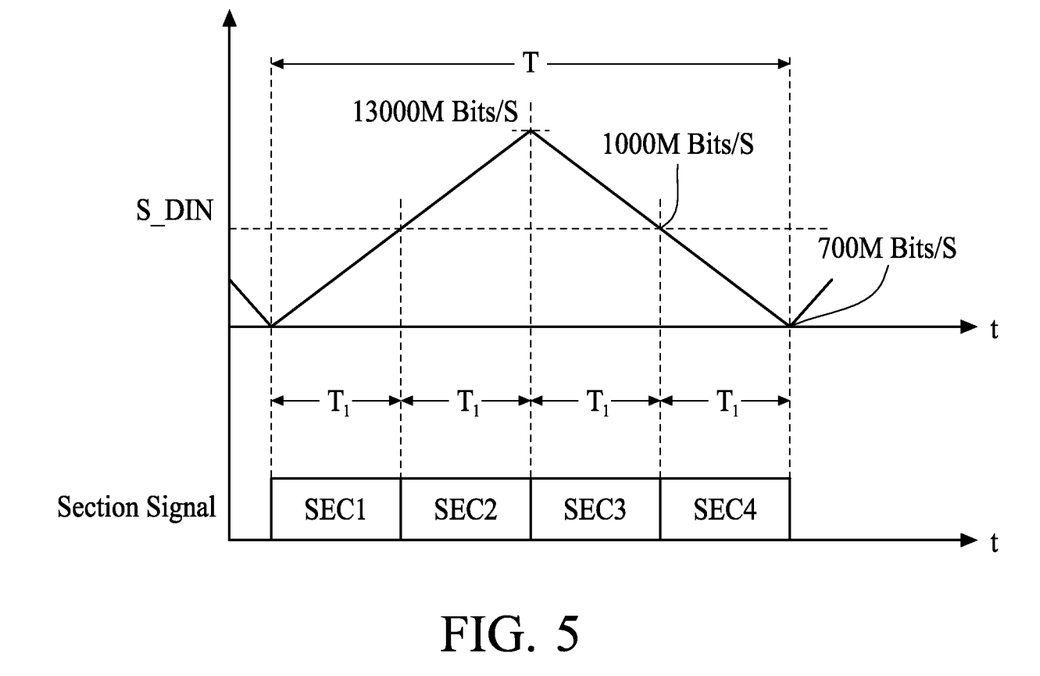
FIG. 5 and FIG. 6 show the details of the method, shown in FIG. 4.
Figure 6:
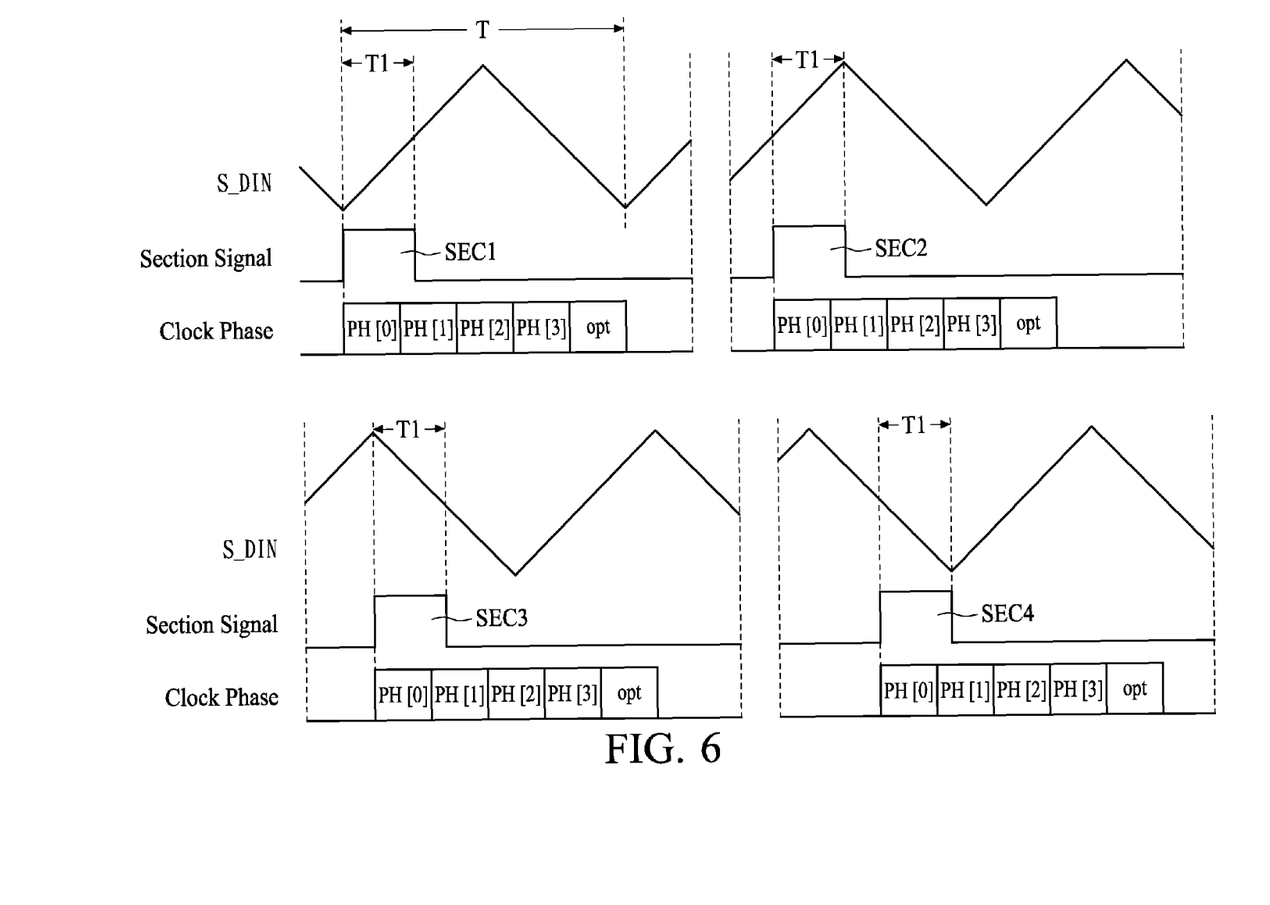

FIG. 5 and FIG. 6 show the details of the method, shown in FIG. 4, for selecting a sampling phase of a data stream. Referring to FIG. 5, a data rate of the data stream S_DIN, during a fixed time period T, may have a maximum data rate at 1300 M Bits/s and a minimum data rate at 700 M Bits/s. Therefore, the middle data rate is 1000 M Bits/s, which means the data stream S_DIN may have a variable data rate during a fixed time period T.

In order to sample bits of data of the data stream S_DIN, transmitted at different data rates during a fixed time period T, a plurality of section signals SEC 1, SEC 2, SEC 3 and SEC 4, which respectively have same time period $T_1$. Then, a plurality of continuous clock phases may be generated according to each of the section signals, SEC 1, SEC 2, SEC 3 and SEC 4.

Referring to FIG. 6, at a rising edge of each of the section signals SEC 1, SEC 2, SEC 3 and SEC 4, a plurality of clock phases PH[0], PH[1], PH[2], and PH[3] may be generated alternately. One of the continuous clock phases corresponding to different section signals SEC1, SEC2, SEC3 and SEC4 may be selected in turn to provide a sample clock phase. In the present embodiment, the clock phase PH[0] corresponding to the section signal SEC1 may be selected as the sampling clock phase.

Then, the clock phases PH[1], PH[2], and PH[3] corresponding to the section signal SEC 1 may be selected in turn as the next one sampling clock phase. Afterwards, the clock phases PH[0], PH[1], PH[2], and PH[3] corresponding to the section signal SEC2 may be selected in turn as the next one sampling clock phase. Then, the clock phases PH[0], PH[1], PH[2], and PH[3] corresponding to the section signal SEC3 may be selected in turn as the next one sampling clock phase. Further on, the clock phases PH[0], PH[1], PH[2], and PH[3] corresponding to the section signal SEC4 may be selected in turn as the next one sampling clock phase. After sampling clock phases are generated, a plurality of sampling results of the data stream S_DIN may be obtained by performing samplings on the data stream S_DIN using the sampling clock phase.

Referring to FIG. 6, in present embodiment, when the clock phase PH[0], corresponding to the section signal SEC1, is the sampling clock phase, the sampling clock phase may perform samplings on the data stream S_DIN within a range of lower data rates such as 700 M Bits/s to 1000 M Bits/s to obtain a plurality of sampling results. When the clock phase PH[0], corresponding to the section signal SEC 2, is the sampling clock phase, the sampling clock phase may perform samplings on the data stream S_DIN within a range of higher data rates such as 1000 M Bits/s to 1300 M Bits/s to obtain a plurality of sampling results.

In the method for selecting a sampling phase of a data stream of one embodiment of the current disclosure, since the clock phase PH[0] may be selected as a sampling clock phase at different ranges of data rates of the data stream S_DIN, thus, sampling results, sampled by the clock phase PH[0], of the data stream S_DIN, working with different data rates may be obtained. Therefore, sampling integrity and sampling reliability of sampling results may be significantly improved.

Furthermore, the current disclosure discloses a method for selecting a sampling phase of a data stream, which may obtains bits of data, transmitted at different data rates during a fixed time period T, of the data stream S_DIN. The method, as a flow chart shown in FIG. 7, may comprise the following steps: step S70, a plurality of calibration signals may be generated, wherein the calibration signals are synchronized with the data stream. Step S72, a plurality of counting values of a rising edge may be generated by calculating the quantity of rising edges of the calibration signals. Step S74, a plurality of clock sequences, having different delay times, may be generated, wherein each of the clock sequences includes a plurality of serial clock phases.

Figure 7:
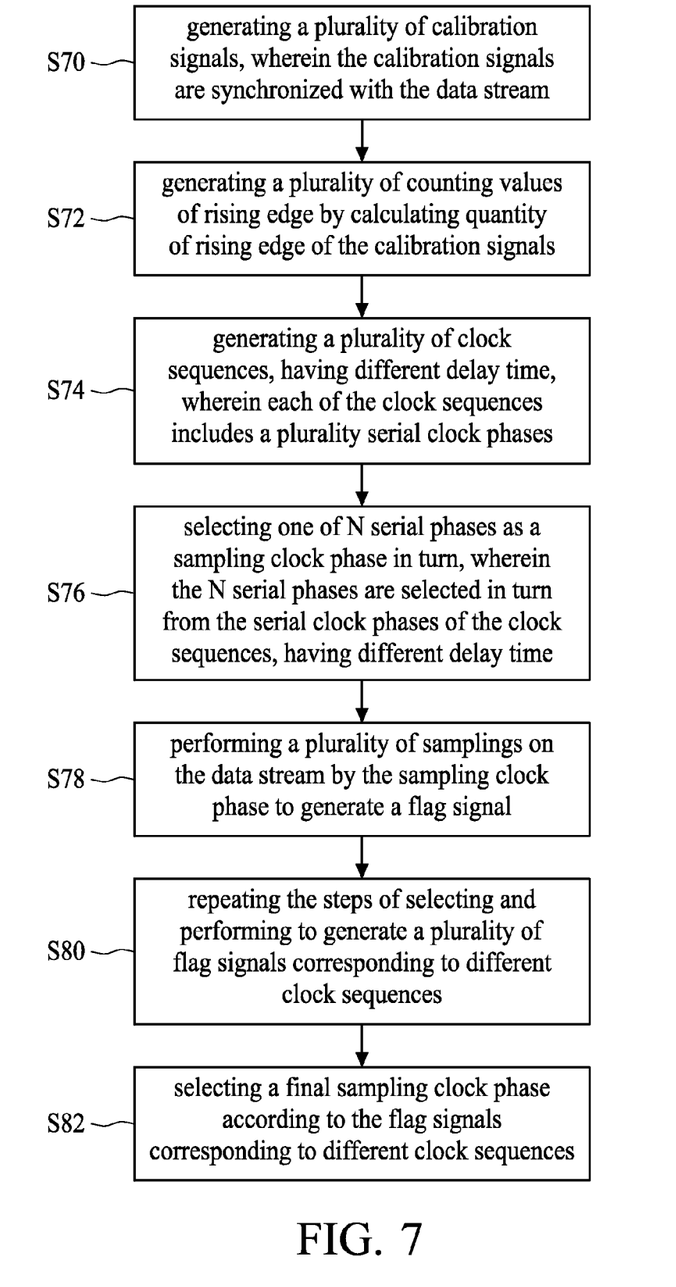
FIG. 7 shows a flow chart of a method for selecting a sampling phase of a data stream of the current disclosure.

Step S76, one of N serial phases may be selected in turn as a sampling clock phase, wherein the N serial phases are selected from is the serial clock phases of the clock sequences, having different delay times. Step S78, a plurality of samplings are performed on the data stream by the sampling clock phase to generate a flag signal. Step S80, the steps of selecting and performing may be repeated to generate a plurality of flag signals corresponding to different clock sequences. Step S82, a final sampling clock phase is selected according to the flag signals corresponding to different clock sequences.

Figure 8:
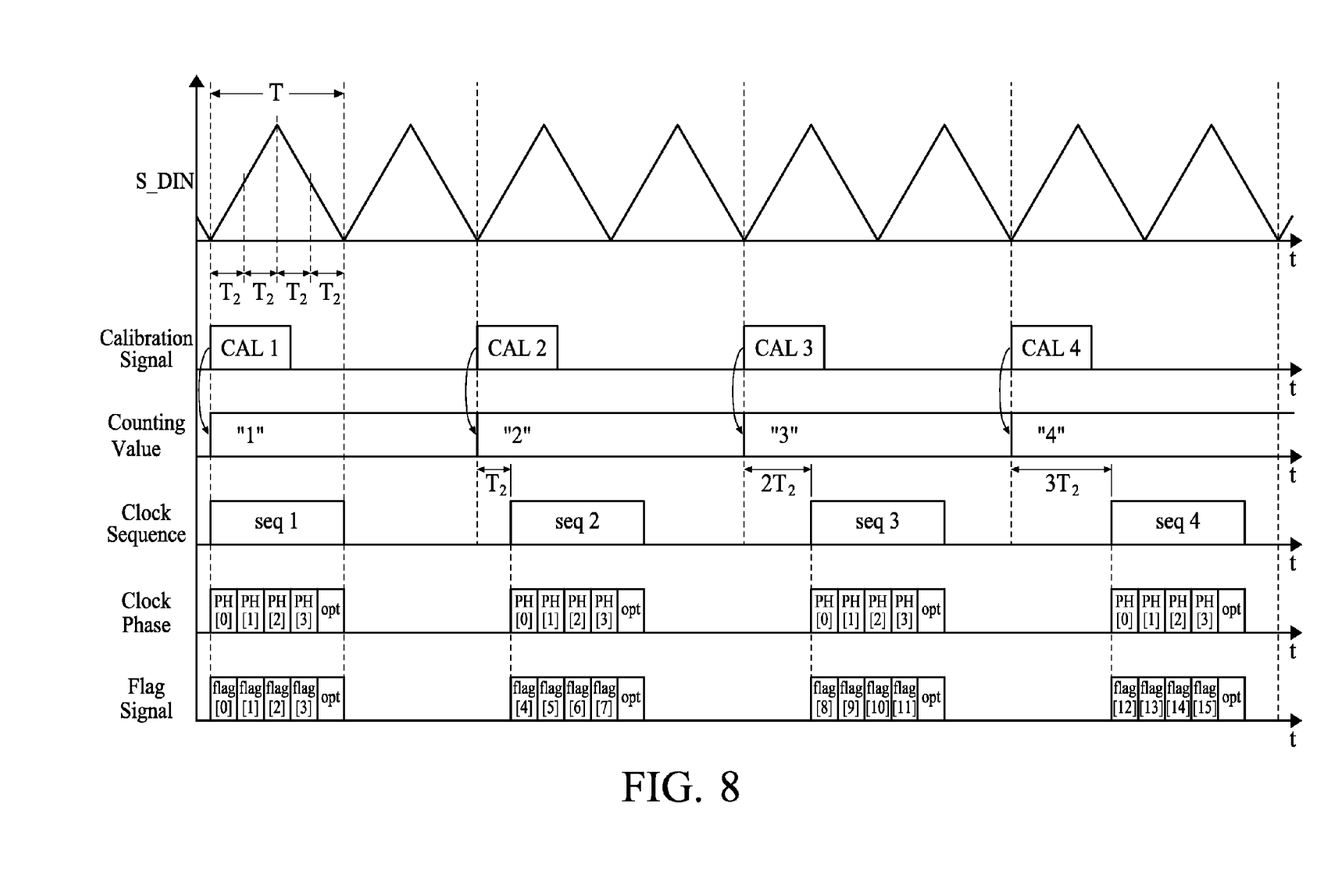
FIG. 8 and FIG. 9 show a schematic view of a method for selecting a sampling phase of a data stream of the current disclosure.

Moreover, the current disclosure discloses details of a method for selecting a sampling phase of a data stream. The method, as shown in FIG. 8, which is a plurality of calibration signals CAL1, CAL2, CAL3, and CAL4 may be generated, wherein the calibration signals are synchronized with the data stream S_DIN. Then, a plurality of counting values of a rising edge may be generated by calculating the quantity of rising edges of the calibration signals, CAL1, CAL2, CAL3, and CAL4.

In the present embodiment, a counter (not shown) may generate a counting value "1" according to a rising edge of the calibration signal CAL1, since the calibration signal CAL1 is a first occurrence of the calibration signals. Then, the counter may generate a counting value "2" according to a rising edge of the calibration signal CAL2, a counting value "3" according to a rising edge of the calibration signal CAL3 and a counting value "4" according to a rising edge of the calibration signal CAL4.

Furthermore, a plurality of clock sequences, seq1, seq2, seq3, and seq4, having different delay times may be generated according to is the counting value, generated by the counter and a predetermined time section. In one embodiment of the present disclosure, the fixed time period T of the data stream S_DIN may be segmented into a plurality of time sections $T_2$, wherein each of the time sections has the same time period and a time period of the predetermined time section may be equal to the time period of each of the time sections $T_2$.

Therefore, a generating time of the clock sequence seq1 may be not behind a generating time of the calibration signal CALL As such, a time delay between the generating time of the clock sequence seq1 and the generating time of the calibration signal CAL1 may be set as "0". Nevertheless, a generating time of the clock sequence seq2 may be behind a generating time of the calibration signal CAL2 by a time $T_2$. As such, a time delay between the generating time of the clock sequence seq2 and the generating time of the calibration signal CAL2 may be set as "$T_2$". Moreover, a generating time of the clock sequence seq3 may be behind a generating time of the calibration signal CAL3 by a time $2 \times T_2$. As such, a time delay between the generating time of the clock sequence seq3 and the generating time of the calibration signal CAL3 may be set as "$2 \times T_2$". Furthermore, a generating time of the clock sequence seq4 may be behind a generating time of the calibration signal CAL4 by a time $3 \times T_2$. As such, a time delay between the generating time of the clock sequence seq4 and the generating time of the calibration signal CAL3 may be set as "$3 \times T_2$".

Referring to FIG. 8, each of the clock sequences may include a plurality of clock phases PH[0], PH[1], PH[2] and PH[3]. After the clock sequences seq1, seq2, seq3, and seq4 are generated, the clock phases PH[0], PH[1], PH[2] and PH[3] may be selected in turn as a sampling clock phase. Then, a plurality of samplings may be performed on the data stream S_DIN to obtain a plurality of sample results of the data stream S_DIN.

Referring to FIG. 8, in the present embodiment, when the clock phase PH[0], corresponding to the clock sequence seq1 is selected as the sampling clock phase, the sampling clock phase may perform sampling on the data stream S_DIN within a range of lower data rates such as 700 M Bits/s to 1000 M Bits/s to obtain a plurality of sampling results. When the clock phase PH[0], corresponding to the section signal SEC2 is selected as the sampling clock phase, the sampling clock phase may perform sampling on the data stream S_DIN within a range of higher data rates such as 1000 M Bits/s to 1300 M Bits/s to obtain a plurality of sampling results.

In the method for selecting a sampling phase of a data stream of one embodiment of the current disclosure, since the clock phase PH[0] may be selected as a sampling clock phase at different ranges of data rates of the data stream S_DIN, thus, sampling results, sampled by the clock phase PH[0], of the data stream S_DIN, working with different data rates may be obtained. Therefore, sampling integrity and sampling reliability of sampling results may be significantly improved.

Referring to FIG. 6 and FIG. 8, a plurality of samplings may be performed on the data stream S_DIN by the sampling clock phase is to generate a flag signal after the sampling clock phase is selected. Referring to FIG. 8, the clock phase PH[0] of the clock sequence seq1 may first be selected as the sampling clock phase. Then, a plurality of samplings may be performed on the data stream S_DIN to generate a plurality of first sampling results. According to the mapping results of the bits of data of the data stream S_DIN and the first sampling results, a value of a flag signal flag[0] may be set up. Therefore, a value of each of the flag signals flag[1], flag[2] and flag[3] of the clock phases PH[1], PH[2] and PH[3] may be set up accordingly.

In one embodiment of the current disclosure, when the first sampling results match the bits of data of the data stream S_DIN, a first counting value may be generated. Then, a first accumulation value may be generated according to an accumulated counting value of the first counting signal. When the first counting value is larger than a first threshold, such as 16 times greater, a value of the flag signal flag[0] may be set up as "1". When the first sampling results do not match the bits of data of the data stream S_DIN, a second counting value may be generated.

A second accumulation value may be generated according to an accumulation value of the second counting signal. When the second accumulation value is larger than a second threshold, such as 5 times greater, a value of the flag signal flag[0] may be set up as "0". Therefore, a value of each of the flag signals flag[1] to flag[15] of different clock sequences, may be set up accordingly.

After the flag signals flag[1] to flag[15] are set up, for is selecting the best sampling clock phase, a logic calculation may be performed on the flag signals flag[1] to flag[15] to generate final flag signals corresponding to the clock phases, PH[0], PH[1], PH[2] and PH[3].

Figure 9:
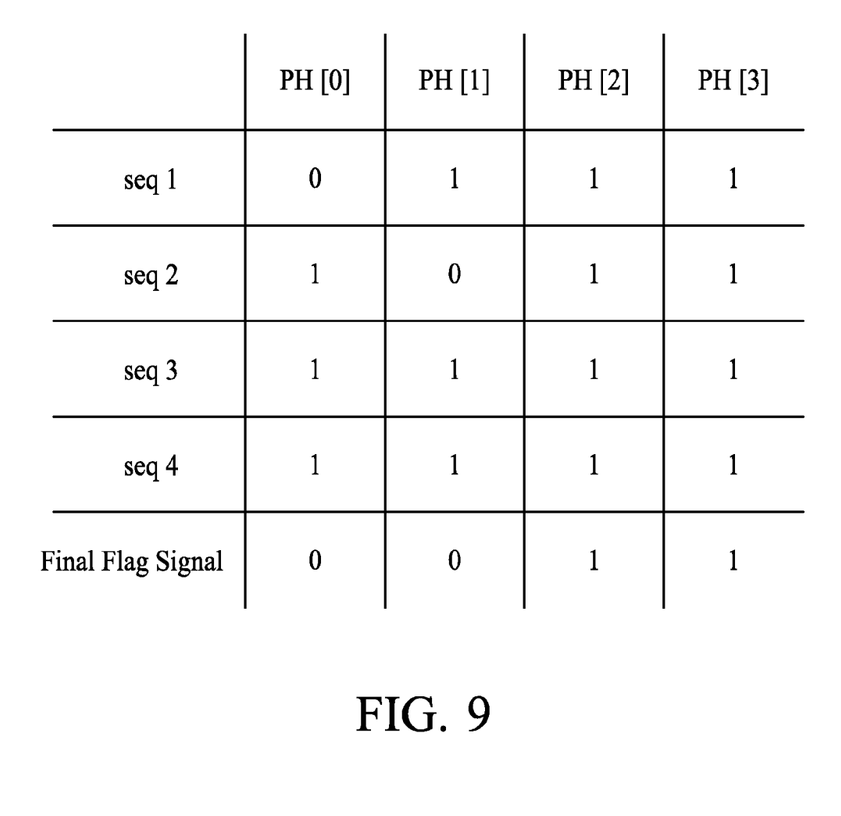

As shown in FIG. 9, flag signals flag[0], flag[4], flag[8] and flag[12] corresponding to the clock phase PH[0] are assumed to be set up as (0,1,1,1). Flag signals flag[1], flag[5], flag[9] and flag[13] corresponding to the clock phase PH[1] are assumed to be set up as (1, 0, 1, 1). Flag signals flag[2], flag[6], flag[10] and flag[14] corresponding to the clock phase PH[2] are assumed to be set up as (1, 1, 1, 1). Flag signals flag[3], flag[7], flag[11] and flag[15] corresponding to the clock phase PH[3] are assumed to be set up as (1, 1, 1, 1).

Then, an AND operation may be performed on said flag signals to generate the final flag signal (0, 0, 1, 1) corresponding to the clock phase PH[0], PH[1], PH[2] and PH[3]. In the end, the final sampling phase may be generated by performing an algorithm, disclosed in R.O.C Patent application 100113490, on the final flag signals corresponding to the clock phase PH[2] and PH[3].

Although the present invention and its objectives have been described in detail, it should be understood that various changes, to substitutions and alterations can be made herein without departing from the spirit and scope of the invention as defined by the appended claims. For example, many of the processes discussed above can be implemented using different methodologies, replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the current disclosure, processes, machines, manufacture, compositions of matter, means, methods, or steps, presently existing or later to be developed, that perform substantially the same function or achieve substantially the same result as the corresponding embodiments described herein may be utilized according to the current disclosure. As such, the appended claims are intended to include within their scope such processes, machines, manufacture, compositions of matter, means, methods, or steps.

What is claimed is:

1. A method for selecting a sampling phase of a data stream, wherein the data stream has a variable data rate during a fixed time period, comprising the following steps:
   generating M section signals, having a same time interval, during the fixed time period of the data stream;
   generating N continuous clock phases, according to a rising edge of each of the section signals;
   selecting one of the N continuous clock phases in turn to provide a sample phase, wherein the continuous clock phases are corresponding to different section signals;
   performing a plurality of samplings on the data stream to generate a flag signal;
   repeating steps of the selecting and the sampling to generate N flag signals which are corresponding to different section signals, wherein the step of repeating steps of the selecting and the sampling further comprises:
      selecting a first clock phase, corresponding to a $M_{th}$ section signal, as a first sampling clock phase;
      performing a plurality of samplings on the data stream by the first sampling clock phase;
      determining if a plurality of sampling results, sampled by the first sampling signal, matches the bits of data of the data stream in order to generate a first flag signal corresponding to the $M_{th}$ section signal;
      selecting a second clock phase, right after the first clock phase, as a second sample clock phase;
      performing a plurality of samplings on the data stream by the second sampling clock phase; and
      determining if a plurality of sampling results, sampled by the second sampling signal, matches the bits of data of the data stream in order to generate a first flag signal corresponding to the $M_{th}$ section signal; and
   selecting a final sampling phase according to the N flag signals which are corresponding to the different section signals.

2. The method for selecting a sampling phase of a data stream of claim 1, wherein the step of determining if a plurality of sampling results, sampled by the first sampling signal, matches the bits of data of the data stream in order to generate a first flag signal corresponding to the $M_{th}$ section signal further comprises:
   determining if the sampling results matches the bits of data of the data stream;
   generating a first counting signal, when one of the sampling results matches the bits of data of the data stream;
   generating a second counting signal, when one of the plurality sampling signals does not match the bits of data of the data stream; and
   generating the first flag signal according to the first counting signal and the second counting signal.

3. The method for selecting a sampling phase of a data stream of claim 2 further comprises:
   generating a first accumulation value according to an accumulated counting value of the first counting signal;
   generating a first comparing signal, when the first accumulation value is larger than a first threshold value;
   generating a second accumulation value according to an accumulated counting value of the second counting signal;
   generating a second comparing signal, when the second accumulation value is larger than a second threshold value;
   generating the first flag signal according to the first and the second comparing signals.

4. The method for selecting a sampling phase of a data stream of claim 1, wherein the step of selecting a final sampling phase, according to the N flag signals, which are corresponding to the different section signals, comprises:
   performing a logic calculation on N flag signals, corresponding to the different section signals, to generate N final flag signals; and
   selecting the final sampling clock phase according to the N final flag signals.

5. A method for selecting a sampling phase of a data stream, wherein the data stream has a variable data rate during a fixed time period, comprising the following steps:
   generating a plurality of calibration signals, wherein the calibration signals are synchronized with the data stream;
   generating a plurality of counting values of a rising edge by calculating the quantity of rising edges of the calibration signals;
   generating a plurality of clock sequences, having different delay times, wherein each of the clock sequences includes a plurality of serial clock phases;
   segmenting a fixed time period of the data stream into a plurality of time sections, wherein each of the time sections has the same time period; and
   setting a delay time of each of the clock sequences according to the time sections and the counting values of a rising edge;
   selecting one of N serial phases as a sampling clock phase, wherein the N serial phases are selected in turn from the serial clock phases of the clock sequences, having different delay times;
   performing a plurality of samplings on the data stream by the sampling clock phase to generate a flag signal;
   repeating the steps of selecting and performing to generate a plurality of flag signals corresponding to different clock sequences; and
   selecting a final sampling clock phase according to the flag signals corresponding to different clock sequences.

6. The method for selecting a sampling phase of a data stream of claim 5, wherein the step of performing a plurality of samplings on the data stream by the sampling clock phase to generate a flag signal, further comprises:
   determining if a plurality of sampling results, sampled by the sampling clock phase, matches the bits of data of the data stream;
   generating a first counting signal, when one of the sampling results matches the bits of data of the data stream;
   generating a second counting signal, when one of the plurality sampling signals does not match the bits of data of the data stream; and generating the first flag signal according to the first counting signal and the second counting signal.

7. The method for selecting a sampling phase of a data stream of claim 6 further comprises:
generating a first accumulation value according to an accumulated counting value of the first counting signal;
generating a first comparing signal, when the first accumulation value is larger than a first threshold value;
generating a second accumulation value according to an accumulated counting value of the second counting signal;
generating a second comparing signal, when the second accumulation value is larger than a second threshold value;
generating the flag signal according to the first and the second comparing signals.

8. The method for selecting a sampling phase of a data stream of claim 5, wherein the step of repeating the steps of selecting and performing to generate a plurality of flag signals corresponding to different clock sequences, comprises:
selecting a first clock phase, corresponding to a first clock sequence, as a first sampling clock phase;
performing a plurality of samplings on the data stream by the first sampling clock phase;
determining if a plurality of sampling results, sampled by the first sampling clock phase, matches the bits of data of the data stream in order to generate a first flag signal corresponding to the first clock sequence;
selecting a second clock phase, right after the first clock phase, as a second sample clock phase;
performing a plurality of samplings on the data stream by the second sampling clock phase; and
determining if a plurality of sampling results, sampled by the second sampling signal, matches the bits of data of the data stream in order to generate a second flag signal corresponding to the first clock sequence.

9. The method for selecting a sampling phase of a data stream of claim 5, wherein the step of selecting a final sampling clock phase, according to the flag signals corresponding to different clock sequences, comprises:
performing a logic calculation on the flag signals, corresponding to the different clock sequences, to generate a plurality of final flag signals; and
selecting the final sampling clock phase according to the final flag signal.

* * * * *